DOUBLE ACTING FREE WHEEL

The present invention concerns a variant of the mechanical torque limiting device combined with disconnection means described in French Pat. No. 1,534,736.

In the embodiment of the above-mentioned device the transmission of the movement is effected through the intermediary of a driver comprising male and female sloping surfaces constantly subjected to the action of a spring initially under compression and acting as a torque measuring device, and a so-called "Autolock" system comprising a stationary circular bowl having therein a central cam which can be locked in the bowl by means of a wedging of rollers or freed relative to the bowl when a disconnection ring which is concentric with the bowl and the central cam and interposed therebetween acts through fingers with which it is provided against the rollers that it unwedges. The disconnection ring normally mounted for rotation by splines with a part of the driver then disconnects the central cam in order that it can turn under the action of the driver or on the contrary stops the movement when the resisting torque increases undesirably by the fact that by reaction the cams exert on the driver a force greater than that of the spring and by the fact that the driver in its axial movement disengages with the disconnection ring which, thus free, permits the rollers to wedge the central cam in the bowl.

In such an arrangement the rollers constantly rub against the interior wall of the stationary bowl which can be a disadvantage owing to the wear of the rollers in the case of prolonged operation.

An aim of the present invention is to overcome this disadvantage by modifying the device described in the above-mentioned French patent.

The present invention consists in a device comprising a driver provided with sloping surfaces fixed for rotation by splines or a key to an operating shaft and acts, owing to a calibrated spring initially under compression, as means for measuring an excessive torque and drives by means of oppositely sloping surfaces a part such as a pinion connected directly or indirectly to an actuating member, this pinion rotatably drives by means of an annular extension integral therewith, concentric with the shaft and provided with suitable grooves, a series of cylindrical rollers leaf-springs fix to the said annular extension are constantly in engagement with the inclined surfaces of a part having as many inclined surfaces as there are rollers and formed as a cam fixed for rotation with the operating shaft, during normal rotation of the operating shaft the said rollers are maintained under the action of the said springs at a slight distance from the interior wall of the stationary bowl serving as a casing for the unit, but are forcibly brought into engagement against the said interior wall as soon as the torque required by the actuating member exceeds a predetermined value and owing to the sloping surfaces acting as the drive for the operating shaft fixed both with the driver and the cam having multiple inclined surfaces instantaneously dephases with respect to the pinion, the said cam, also dephased, then exerts its wedging action which instantaneously causes the locking of the operating shaft.

Other features will be further brought out in the following description with reference to the accompanying drawings, in which:

FIG. 1 schematically shows in longitudinal section an embodiment of the present invention;

Figure 1:
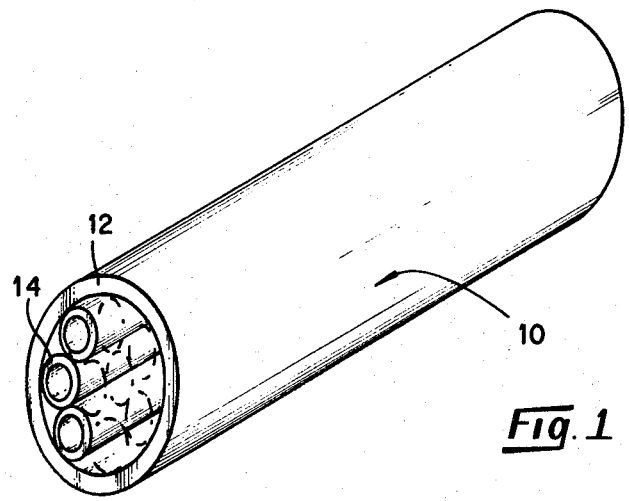

In the embodiment shown in FIG. 1 and provided merely by way of a non-limiting example, the present device comprises an operating shaft 101 mounted in bearings 102 and 103 housed respectively in casings 104 and 105 fixed on a central casing 106 by screws.

The operating shaft 101 rotatably drives through a key 107 a driver 108 provided with symmetrical sloping surfaces 109, for example male. These surfaces are normally in engagement with oppositely sloping surfaces 110 provided at one end of a tubular element 111 concentric with the operating shaft 101 and a bevel pinion 112, for example, is provided at the other end of the element 111 and is continuously in mesh with a bevel wheel 113 fixed to an output shaft 114 connected to an actuating member (not shown).

The tubular element 111 ends with an annular extension or member 115 (shown both in FIGS. 2 and 3) comprising milled slots or grooves 116, for example in which are housed rollers 117. The tubular element 111 axially abuts against stop portions 118 fixed to the shaft 101. The tubular element 111 is moreover urged against this portion by a spring 119 which bears against the collar of the driver 108 and the abutment 120 which in turn bears against a stop portion 121. The spring 119 is calibrated so that the sloping surfaces 109 and 110 only begin to disengage when the resisting torque opposed by the tubular element 111 reaches a predetermined value.

The device further comprises a cam 122 concentric to the shaft 101 and fixed thereto by a key 123 and disposed inside the annular extension 115 which is disposed at the other end of the tubular element 111. The cam 122 includes inclined surfaces 124 which for example are flat and normally oriented perpendicular to the axes of the slots 116. The rollers 117 act against the inclined surfaces at their center by the leaf springs 125 fixed by screws 126 to the annular extension 115 dimensioned to resist the centrifugal force to which each roller is subjected when the shaft 101 turns.

Figure 2:
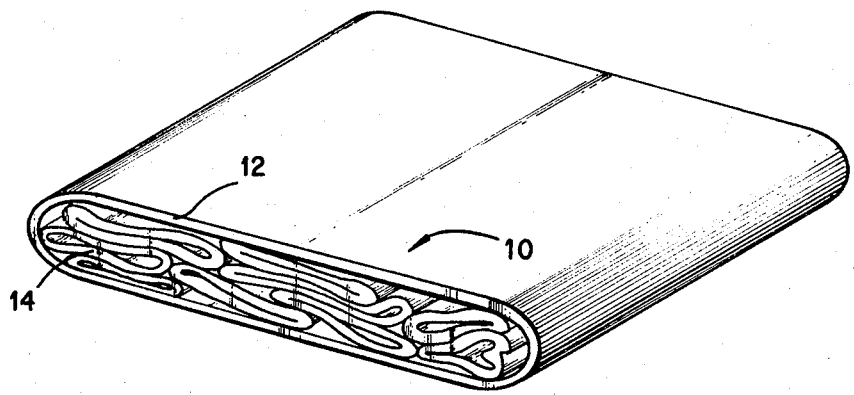
FIG. 2 shows the device in cross-section along the line II—II of FIG. 1, the locking device being in its unlocked position.

By construction, when the sloping surfaces 109 and 110 of the driver 108 and the tubular element 111 respectively are completely engaged, there is still a slight clearance of several tenths of a millimeter, visible at 128 in FIG. 2 between the rollers 117 and the interior wall of the stationary bowl 127 fixed to the casing 104 and 106. The entire unit is therefore free to turn without the rollers 117 continually rubbing against the interior wall of the bowl 127.

On the other hand, if the resisting torque on the actuating member exceeds a predetermined set value, a function of the slope of the sloping surfaces 109 and 110 and the force of the spring 119, the sloping surfaces 109 and 110 disengage, and according to the case the tubular element 111 stops rapidly or slows up and dephases relative to the operating shaft 101.

Figure 3:
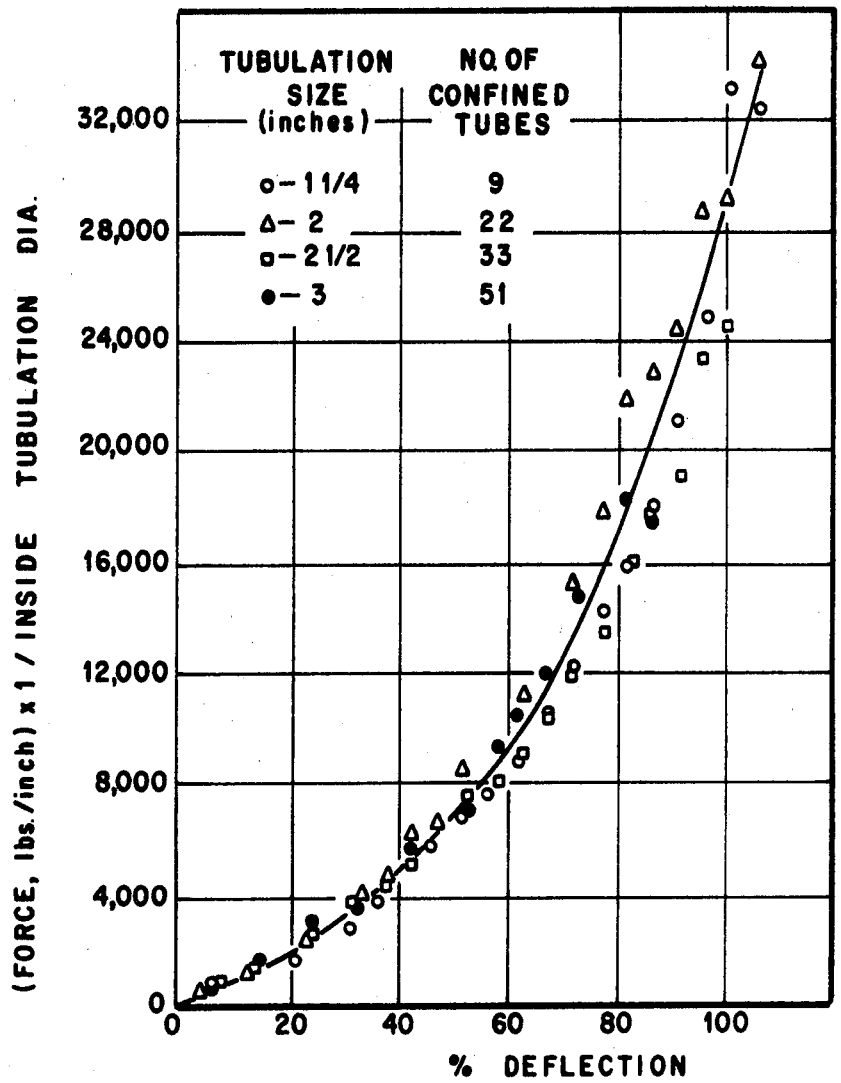
FIG. 3 shows a similar cross-section of the device but in which the locking device is in its locking position relative to the operating shaft.

As soon as the relative dephasing shown in FIG. 3 occurs, the inclined surfaces 124 while shifting relative to their normal position move the rollers 117 disposed in the slots 116 outwardly. When the dephasing reaches a sufficient value, the clearance 128 is taken up and the rollers come into contact with the interior wall of the bowl 127.

If at the moment this contact takes place, the planes tangent to the bowl passing through the generatrices 129 and 130 at which the rollers 117 are in contact with the interior of the bowl 127 and the inclined surfaces 124 form an angle therebetween of approximately 10°, a value that can easily be obtained by suitable adjustment of the clearance 128; a locking of the operating shaft 101 is instantaneously obtained by the wedging of the rollers 117 under the effect of the inclined surfaces 124 on the cam 122 fixed to the shaft 101 in the bowl 127.

If the operating shaft is acted upon by an actuating device comprising a device shown in FIGS. 1 and 2 of the above-mentioned French patent, the overloading which is produced at the moment of braking of the shaft of the steering gear which connects it to the actuating unit causing the disconnection of the "Autolock" drive thereof. If the actuating unit is simply provided with a friction torque-limiting device, the torque-limiting device will begin to slide as soon as the steering gear is locked.

The reverse operation is also possible since, as soon as the shaft 101 is driven in the opposite direction, the inclined surfaces 124 will tend to separate from the rollers 117 which will cause the wedging action to disappear and the inclined sur-

PATENTED JUL 11 1972

3,675,746

SHEET 1 OF 3

INVENTOR.
Alvin R. Irvine
BY
ATTORNEY.

INVENTOR.
Alvin R. Irvine

IMPACT ENERGY ABSORBER

The present invention relates generally to an energy absorber, and more particularly to an impact energy absorber in which the deformation of a tubular structure consisting of a bundle of tubes within a tubular confinement provides the energy absorption. This invention was made in the course of, or under, a contract with the U.S. Atomic Energy Commission.

The transportation and other handling of loaded shipping containers often necessitate the use of shock absorbing systems for preventing or minimizing damage to the container and its contents in the event the container is dropped or otherwise mishandled. In some instances known deformable impact absorbers such as cellular foam, honeycomb, corrugated panels and the like have been successful. However, with laden containers weighing up to about 100 tons such as in the case of the shipping casks proposed for transporting spent nuclear reactor fuel elements such impact absorbers are not satisfactory, particularly in view of the present shipping regulations which specify cask integrity with a 30-foot free drop. The shortcomings of these previously known impact absorbers which render them unsatisfactory are that their energy absorption per unit volume is relatively small and, in some cases, the load must be applied in a specific direction. Thus, with relatively heavy loads the size of the impact absorbers required for adequate impact absorption would be prohibitively massive. Also, the required orientation of the shock absorbers possibly necessary for effective operation considerably detracts from their use.

It is therefore the principal aim or objective of the present invention to provide an impact absorber which is deformable upon impact to absorb impact energy with relatively low specific space and weight characteristics. This impact energy absorber consists of a conduit, or tubulation, within which is packed a bundle of smaller uniform diameter tubes.

Other and further objects of the invention will be obvious upon an understanding of the illustrative embodiment about to be described, or will be indicated in the appended claims, and various advantages not referred to herein will occur to one skilled in the art upon employment of the invention in practice.

An embodiment of the invention has been chosen for the purpose of illustration and description. The embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 4:
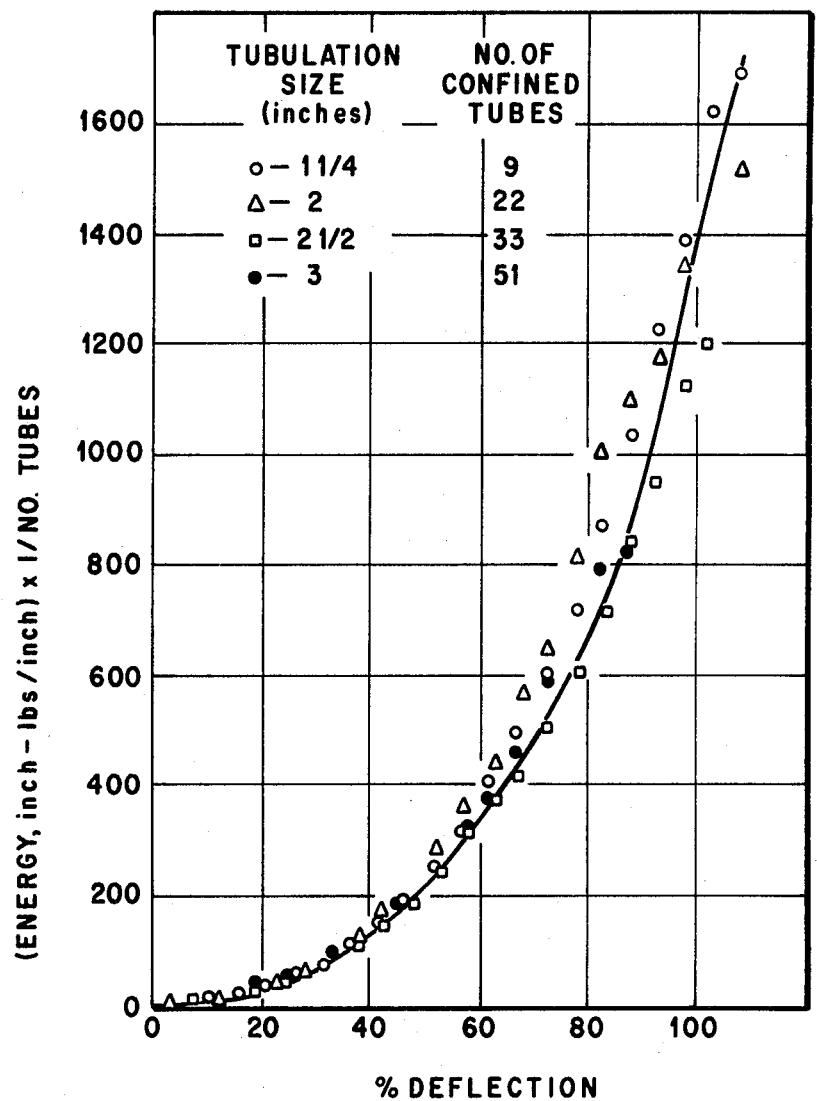

In the accompanying drawings:

FIG. 1 is a perspective view of the impact energy absorber of the present invention;

FIG. 2 is a perspective view showing the condition of the impact energy absorber of FIG. 1 after deformation;

FIG. 3 is a graph showing force as a function of deflection or deformation for several embodiments of the impact energy absorbers of the present invention; and FIG. 4 is a graph showing the amount of energy absorbed as a function of deflection or deformation of impact energy absorbers similar to those used in FIG. 3.

As shown in FIGS. 1 and 2, the impact energy absorber 10 of the present invention consists of a relatively large diameter conduit or tubulation 12 within which is packed a plurality of smaller tubes 14 of essentially like diameters. The tubes 14 are not attached to one another and are packed or bundled in such a manner that the maximum number of tubes are disposed within the tubulation 12 with each tube contacting one or more adjacent tubes and with the outermost tubes of the bundle being contiguous to the inner surface of the tubulation 12. This arrangement of the tubes 14 within the tubulation 12 permits free cross-sectional flow or movement and rearrangement of the tubes within the tubulation 12 during the deflection or deformation of the latter. As the cross-sectional area of the tubulation 12 decreases, the resistance to deformation increases due to the progressive deformation of the tubes 14. This increase in resistance to deformation increases at a readily predictable and somewhat linear rate with deformation, as shown in FIGS. 3 and 4 and described in greater detail below. With the tubes flowing within the tubulation 12 during the initial deformation thereof the load upon each of the tubes is applied essentially concurrently to assure that the deformation of the tubes is essentially equalized or uniform among the tubes in the bundle. In other words, this flow of the tubes within the confines of the tubulation provides for a force distribution among the tubes that is analogous to force distribution in hydraulic systems.

The outer conduit or tubulation 12 employed as the retaining or confining structure for the tubes 14 may be of any suitable commercially available pipe or conduit or, if desired, manufactured specifically for use as the confining tubulation. For example, commercially available Schedule 40 pipe ranging in diameters, i.e., inner diameters, from 1.25 to 3 inches have been satisfactorily employed. The tubulation can be formed of stainless steel or of other ductile, high strength steels, metals or alloys. The length of the confining tubulation may be of any length suitable for the intended purpose which should be at least coextensive in length with the confined tubes.

The tubes packed within the confining tubulation may be of the same material as the latter and are considerably smaller in diameter and wall thickness than the confining tubulation. Satisfactory results have been obtained by using 0.375-inch outer diameter tubes within the confining conduits of the aforementioned diameters. With these tubes packed tightly within the tubulation the desired flow and deformation of the tubes occur when subjected to an impact loading. Without the maximum number of tubes in the tubulation significant energy absorption would be delayed until the cross section of the confining tubulation was reduced to the combined cross section of the small tubes present. The energy absorption capacity of such a system would be reduced and the deceleration would be more abrupt. The wall thickness of the confined tubes must be thin enough so that upon an impact loading the confining tubulation does not fail and also be sufficiently thick so as to absorb the impact energy in the intended manner. To establish a suitable range of wall thicknesses for the tubes for absorbing impact energy from loads up to 100 tons or more, tests were conducted with a 2-inch I.D. stainless steel tubulation 3 inches long and filled with 22 0.375-inch O.D. stainless steel tubes having wall thicknesses ranging from 0.032 to 0.125 inch. These specimens were deformed under the impact of a 310-pound hammer which was dropped from a height of 30 feet. The tests demonstrated that a wall thickness of about 0.065 inch is desirable for stainless steel tubes when impacted with loads as described above. Tubes having significantly thinner walls than about 0.065 inch collapsed with minimal, i.e., less than adequate, energy absorption whereas with tubes having appreciably thicker walls the confining tubulation could not exert sufficient retaining force to hold the tubes within its perimeter upon being subjected to a heavy loading. In this latter case most of the impact or load energy was transmitted to the wall of the tubulation rather than the tubes and caused the tubulation to fail under tension. Further, it can be seen that the use of very thick wall tubes will severely limit the maximum deformation and thereby cause a more rapid deceleration than would otherwise exist with thinner walled tubing. The number of tubes in the confining tubulation varies with the cross-sectional area of the latter in that confining tubulations having diameters of 1.25, 2, 2.5 and 3 inches are loaded with 9, 22, 33 and 51 0.375-inch O.D. tubes, respectively. Larger diameter tubulations would, of course, require a greater number of such tubes. For example, with a 6-inch diameter tubulation approximately 200 0.375-inch tubes would be used.

Tubes of other metals and of dimensions other than the 0.375-inch O.D. described above may be satisfactorily employed within the confining tubulations without departing from the spirit of the scope of the present invention. Also, with tubulations having thicker walls or with tubulations formed of material stronger than provided by Schedule 40 pipe the wall thickness of the tubes could be greater. Of course, when using tubes of greater wall thickness the impact load must necessarily be greater than with the thinner tubes to effect deformation and the resulting impact absorption. Further, with tubes formed of a material having less strength than stainless steel, e.g., aluminum or carbon steel, the wall thickness of the tubes may be increased to compensate for the difference in strength. In any case, the thickness of the tubes must not exceed that which can adequately deform to absorb the applied impact energy.

Energy absorbers of various diameters were fabricated from 304 stainless steel in 3-inch lengths. These absorbers were tested using a hammer-load cell-oscilloscope combination to record load or deformation force as a function of time. A 310-pound hammer was dropped from a height of 30 feet upon a load cell in contact with the energy absorbers. The resulting force-time plot was converted to a force-deflection curve and the data obtained were averaged and plotted as shown in FIGS. 3 and 4. The curves illustrated indicate that the applied forces and energy absorption capabilities of the energy absorbers can be predicted with close accuracy. The force and energy values are per inch of length of the energy absorber being deflected and 100 percent deflection is arbitrarily defined as the original combined thickness of all metal walls present across the flattened portion of the energy absorber.

It will be seen that the present invention provides a compact energy absorber which is easily manufactured and which can be successfully employed to protect relatively heavy loads from impact damage. The impact absorber takes up considerably less space than previously known shock or impact energy absorbers capable of absorbing a similar amount of impact energy.

What is claimed is:

1. A deformable impact energy absorbing device comprising an elongated metal tubulation, and a quantity of discrete metal tubes of essentially uniform diameter disposed within said tubulation in a side-by-side abutting relationship with one another and with the radially outermost tubes of said plurality of tubes being contiguous to said tubulation, said tubes being of a quantity corresponding to the maximum number of tubes disposable in said tubulation and having essentially similar wall thickness with the latter being less than that which would cause the tubulation to fail under tension when subjected to a cross-sectional-area-decreasing impact loading.

2. The deformable impact energy absorbing device claimed in claim 1, wherein said tubulation and said tubes are of stainless steel, said tubulation has an inner diameter in the range of 1.25 to 6 inches, and said tubes have an outer diameter of 0.375 inch and a wall thickness of about 0.065 inch.

* * * * *